United States Patent [19]
Tanoue et al.

[11] Patent Number: 6,128,260
[45] Date of Patent: Oct. 3, 2000

[54] OPTICAL INFORMATION RECORDING MEDIUM AND INFORMATION RECORDING METHOD

[75] Inventors: Koki Tanoue; Hideaki Osawa, both of Yokohama, Japan

[73] Assignee: Kabushiki Kaisha Toshiba, Kawasaki, Japan

[21] Appl. No.: 09/055,349

[22] Filed: Apr. 6, 1998

[30] Foreign Application Priority Data

Apr. 18, 1997 [JP] Japan .................................. 9-101118

[51] Int. Cl.⁷ ...................................................... G11B 5/09
[52] U.S. Cl. ......................................... 369/47; 369/275.3
[58] Field of Search ................................ 369/47, 48, 49, 369/275.3; 360/48, 50, 51

[56] References Cited

U.S. PATENT DOCUMENTS 5,216,657  6/1993  Nishiuchi et al. .

FOREIGN PATENT DOCUMENTS

674314A1   9/1995   European Pat. Off. .
813198A2  12/1997   European Pat. Off. .
97/30439   8/1997   WIPO .

OTHER PUBLICATIONS

Patent Abstracts of Japan, vol. 013, No. 032 (P–817), Jan. 1989 re JP 63229625A.
Patent Abstracts of Japan, vol. 017, No. 454 (P–1596), Aug. 1993 re JP 05101389A.
Patent Abstracts of Japan, vol. 015, No. 382 (P–1257), Sep. 1991 re JP 03150725A.
Patent Abstracts of Japan, vol. 097, No. 011, Nov. 1997 re JP 09180190A.

*Primary Examiner*—Paul W. Huber
*Attorney, Agent, or Firm*—Pillsbury Madison & Sutro LLP

[57] ABSTRACT

Information is recorded/reproduced on/from an information recording medium in units of sectors each having a preformatted header field and a recording field using a change in optical characteristics due to a phase change. The recording field includes an actual recording field rewritably records information, and a gap field arranged before the actual recording field, having a length set on the basis of a random number, and having no information. The recording start position of the actual recording field is set at random. A guard field recording dummy data and having a length set on the basis of a random number is formed next to the gap field. Start portion degradation in the recording layer due to overwrite is generated only in the guard field.

12 Claims, 4 Drawing Sheets

| DATA BEFORE CONVERSION | STATE 1 CONVERSION CODE NS. | STATE 2 CONVERSION CODE NS. | STATE 3 CONVERSION CODE NS. | STATE 4 CONVERSION CODE NS. |
|---|---|---|---|---|
| 0 | 00100000000010011 | 01000001001000002 | 00100000000010011 | 01000001001000002 |
| 1 | 00100000000100101 | 00100000000100101 | 10000001001000003 | 10000001001000003 |
| 2 | 00100001001000002 | 00100001001000002 | 10000000000100101 | 10000000000100101 |
| 3 | 00100000010010002 | 01000100100000004 | 00100000010010002 | 01000100100000004 |
| 4 | 00100000100100002 | 00100000100100002 | 10000001001000002 | 10000001001000002 |
| 5 | 00100000001001002 | 00100000001001002 | 10010010000000004 | 10010010000000004 |
| 6 | 00100000001001003 | 00100000001001003 | 10001001000000004 | 10001001000000004 |
| 7 | 00100000010010003 | 01000000000100101 | 00100000010010003 | 01000000000100101 |
| 8 | 00100000100100003 | 00100000100100003 | 10000100100000004 | 10000100100000004 |
| 9 | 00100001001000003 | 00100001001000003 | 10010010000000011 | 10010010000000011 |
| 10 | 00100100100000004 | 00100100100000004 | 10001001000000011 | 10001001000000011 |
| 11 | 00100010010000004 | 00100010010000004 | 10000000100100003 | 10000000100100003 |
| 12 | 00100100100000011 | 00100100100000011 | 10000000100100002 | 10000000100100002 |
| 13 | 00100010010000011 | 00100010010000011 | 10000100100000011 | 10000100100000011 |
| 14 | 00100000010010011 | 01000000001001003 | 00100000010010011 | 01000000001001003 |
| 15 | 00100001001000011 | 00100001001000011 | 10000010010000011 | 10000010010000011 |
| 16 | 00100000100100011 | 00100000100100011 | 10000001001000011 | 10000001001000011 |
| 17 | 00100000001000101 | 00100000001000101 | 10000010010000004 | 10000010010000004 |
| 18 | 00010000000010011 | 01000000100100002 | 00010000000010011 | 01000000100100002 |
| ⋮ | | | | |
| 247 | 00001000100000101 | 00001000100000101 | 10000100000100101 | 10000100000100101 |
| 248 | 00001001000010011 | 01000100100100011 | 00001001000010011 | 01000100100100011 |
| 249 | 00001000010000011 | 00000100100100101 | 10000100000010011 | 10000100000010011 |
| 250 | 00000100100100101 | 00000100100100101 | 10000010000000101 | 10000010000000101 |
| 251 | 00000100010000101 | 00000100010000101 | 10000001000000011 | 10000001000000011 |
| 252 | 00000100100010011 | 01000100001000101 | 00000100100010011 | 01000100001000101 |
| 253 | 00000100001000011 | 00000100001000011 | 01001000100010011 | 01001000100010011 |
| 254 | 00000100010001002 | 01000100000100011 | 10010000000100002 | 01000100000100011 |
| 255 | 00000010000010002 | 01000010000100101 | 10001001000100002 | 01000010000100101 |

OPTICAL INFORMATION RECORDING MEDIUM AND INFORMATION RECORDING METHOD

BACKGROUND OF THE INVENTION

The present invention relates to an information recording medium on/from which information is recorded/reproduced in units of sectors and, more particularly, to an information recording medium such as an optical disk for recording/reproducing information using a change in optical characteristics due to a phase change, i.e., the difference in reflectance between the crystalline state and amorphous state of a recording film due to a change in optical constant, and a method of recording information in this information recording medium.

Examples of so-called rewritable optical disks allowing information recording/reproduction, which are already commercially available, are a 120-mm magneto-optical disk, a 90-mm magneto-optical disk, and a 120-mm phase change disk (so-called PD).

Of these optical disks, the phase change optical disk records information by irradiating a laser beam whose irradiation intensity is modulated in correspondence with the information to be recorded. This phase change optical disk does not require a means for generating a magnetic field on the recording apparatus side, unlike an optomagnetic disk, and hence is advantageous to reduce the size and weight of the recording apparatus.

For the phase change optical disk, a laser beam is irradiated on the recording layer (recording film) to record information. When the recording layer portion in a crystalline state is heated to the melting point or more and then abruptly cooled, the crystalline state changes to an amorphous state. When the recording layer portion in the amorphous state is heated to a predetermined temperature equal to or lower than the melting point and then cooled, the amorphous state changes to the crystalline state.

To record information on the phase change optical disk having a recording layer with such characteristics, the recording layer on which information is to be recorded is heated to the melting point or more by irradiating the laser beam. Upon abruptly cooling the recording layer immediately after laser beam irradiation, the recording layer which had been in the crystalline state before laser beam irradiation phase-changes to the amorphous structure.

The most disadvantageous point of the phase change optical disk is degradation in phase change recording layer due to a repeated overwrite, i.e., a data rewrite. In an overwrite, the temperature of the phase change recording layer of the phase change optical disk is increased to the melting point or more and then abruptly cooled to form the amorphous. At this time, the phase change recording layer is temporarily melted. For this reason, when one portion is repeatedly subjected to the overwrite, the phase change recording layer moves along the scanning direction of laser beam (this phenomenon will be referred to as substance movement hereinafter). If the overwrite is repeated, the substance movement is accelerated to result in the omission of the phase change recording layer itself depending on the position, so data may be damaged. Especially, the waveform may be largely distorted at the initial defective portion and the start and end portions of data. This is because substance movement is conspicuous in the recording layer area adjacent to a normally solid area where no data is written.

If information is repeatedly recorded on one sector of the phase change optical disk tens of hundreds of times using laser beam radiation, the substance movement degrades the signal quality over the recording area of this sector. This will be referred to as degradation (whole field degradation) due to repeated recording. This degradation in signal quality is particularly conspicuous at the start and end portions of the recording portion, as described above. More specifically, since the conventional recording apparatus starts to write data from a predetermined portion, not only the whole field degradation but also the substance movement is especially conspicuous at the recording start and end portions of the recording area. This results in a larger distortion in signal than that due to whole field degradation, so signal reproduction becomes difficult. This will be referred to as start/end portion degradation due to repeated recording.

BRIEF SUMMARY OF THE INVENTION

It is an object of the present invention to solve the above problem, i.e., degradation in signal quality or difficulties in signal reproduction due to whole field degradation and start/end portion degradation.

More specifically, the present invention has as its object to provide an information recording medium and information recording method which allow to prevent the quality of a signal to be reproduced from degradation or signal reproduction from becoming difficult even when information is repeatedly recorded, thereby preventing degradation in reliability in data reproduction.

In order to achieve the above object, according to one aspect of the present invention, there is provided an information recording medium on/from which information is recorded/reproduced in units of sectors each having at least a header field on which address information is recorded in advance and a recording field arranged next to the header field, using a change in optical characteristics due to a phase change, the recording field comprising an actual recording field on which information is rewritably recorded, and a first nonrecording field arranged before the actual recording field and having a length set on the basis of a first random number to prevent interference between the header field and the actual recording field.

Since the length of the first nonrecording field is set at random, the recording start position of the actual recording field overwritten by a laser beam is also set at random, so start portion degradation can be minimized.

The recording field comprises a second nonrecording field arranged next to the actual recording field and having a length set on the basis of the first random number to prevent interference between a recording field of the next sector and the actual recording field. A sum of the lengths of the first and second nonrecording fields always has a predetermined value. Since the recording end position of the actual recording field is also set at random, end portion degradation can be minimized.

The actual recording field includes a first dummy data field arranged at the start of the actual recording field and having a predetermined length, the first dummy data field recording dummy information which need not be properly reproduced. Start portion degradation occurs only in the first dummy data field, so start portion degradation does not take place in a field to actually record necessary data.

Since the predetermined length of the first dummy data field is set on the basis of a second random number, start portion degradation is prevented.

The actual recording field includes a second dummy data field arranged at the end portion of the actual recording field and having a length set on the basis of the second random number, the second dummy data field recording dummy information which need not be properly reproduced. A sum of the lengths of the first and second dummy data fields is always constant. Since end portion degradation occurs only in the second dummy data field, end portion degradation does not take place in fields to actually record necessary data.

According to another aspect of the present invention, there is provided an information recording method comprising the steps of generating a first random number, and forming, before the actual recording field, a first nonrecording field having a length set on the basis of the first random number to prevent interference between the header field and the actual recording field. The recording start position of the actual recording field is set at random.

The information recording method of the present invention further comprises generating a second random number, and recording first dummy information having a predetermined length set on the basis of the second random number, which need not be properly reproduced, at the start of the actual recording field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a conversion table for explaining 8–16 modulation;

DETAILED DESCRIPTION OF THE INVENTION

An embodiment of the present invention will be described below with reference to the accompanying drawing.

Figure 1:
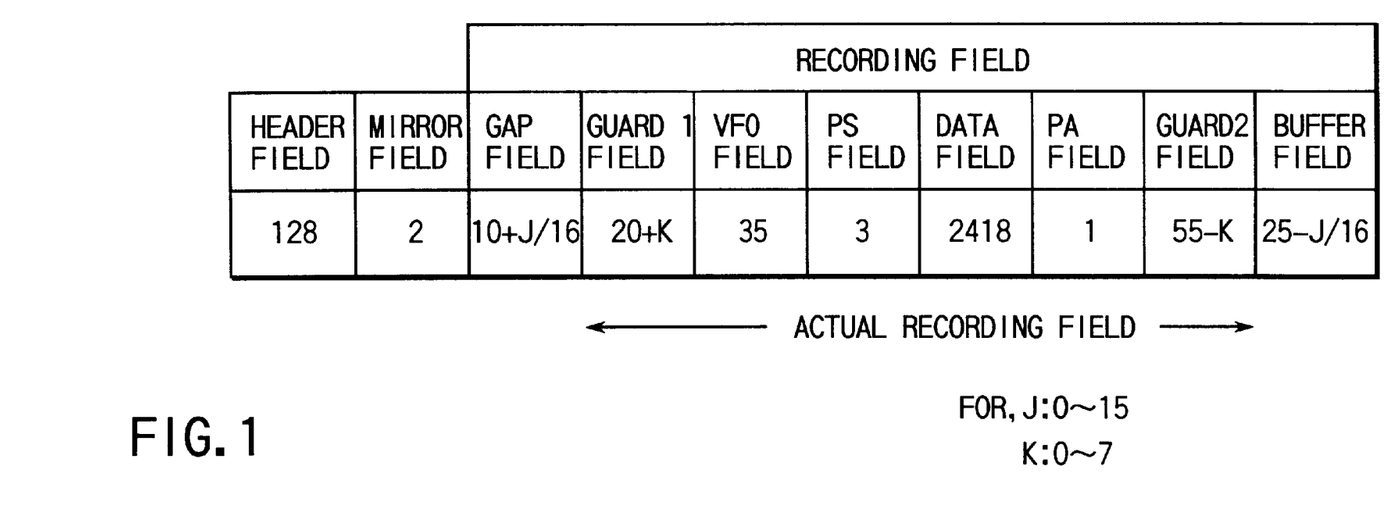
FIG. 1 is a view showing the structure of a sector in an information recording medium according to an embodiment of the present invention.

FIG. 1 schematically shows the contents of a sector format of a phase change optical disk in which information is recorded on the basis of the present invention. FIG. 1 also shows the number of bytes occupied by each portion in the sector which is divided in units of functions. In this specification, 16 channel bits are defined as one byte. FIG. 1 is divided into three parts in the vertical direction. The upper stage shows the range of a recording field, the intermediate stage shows the names of fields, and the lower stage shows the numbers of bytes.

The "Recording field" at the upper stage is a portion where information can be rewritten by a laser beam emitted from the light source of an information recording apparatus. The remaining portions, i.e., a "Header field" and a "Mirror field" shown at the intermediate stage, which are arranged before the "Recording field", are fields where pieces of predetermined information have been recorded in advance as three-dimensional pits in manufacturing the optical disk, and called preformat fields.

Of these preformat fields, the "Header field" is a field where predetermined address information, i.e., a sector address is recorded. More specifically, the "Header field" comprises, e.g., a "VFO field", an "AM field", a "PID field", an "IED field", and a "PS field" (none are shown). The "VFO (Voltage Frequency Oscillator) field" is a pull-in area for PLL (Phase Locked Loop). The "VFO field" causes a PLL circuit in an information recording apparatus (to be described later) to extract a synchronous signal in the "VFO field" to perform the pull in. The "AM (Address Mark) field" is a synchronous code used to determine the word boundary in demodulation by the information recording apparatus. The "PID (Physical ID) field" is a sector address field representing sector information and sector number. The "IED (ID Error Detection code) field" is an error detection code for the "PID field". The "PA (Post Amble) field" is a code necessary for setting the state of preceding bytes in demodulation.

Of the preformat fields, the "Mirror field" is formed as a mirror surface without three-dimensional pits, so that the reflectance can be detected at this portion.

The respective fields in the "Recording field" shown at the upper stage will be described next.

A "Gap field" is a gap for preventing the "Recording field" from overlapping the preformat fields, so no information is recorded on this "Gap field". The "Gap field" has a length of (10+J/16) bytes. Of this length, 10 bytes are a length necessary for this field to function as a gap for preventing the "Recording field" from overlapping the preformat fields. The value J is selected from integers of 0 to 15 at random. More specifically, the value J is a random number, and "J/16" bytes corresponds to one of 0 to 15 bits. The value J is set by a random shift parameter generator (to be described later). On the basis of the value J, 16 different lengths can be set for the "Gap field" at random.

When the length of the "Gap field" is changed at random, pits are formed at 16 different positions in units of channel bits even when the same channel data (data of the subsequent "Guard 1 field" or the like) is repeatedly recorded on one sector. If information recording is started from one position every time, substance movement occurs at that position every time, so the reflectance locally varies.

However, as in this embodiment of the present invention, when information recording is started with 16 shifts, i.e., from 16 different positions, the local variation in reflectance is minimized, so degradation in reproduced signal quality can be prevented.

A "Guard 1 field" is a field, i.e., a dummy field for absorbing start portion degradation due to repeated recording. Information which need not be properly reproduced is recorded in this "Guard 1 field". As described above, if information is repeatedly recorded at a predetermined position, the signal quality degrades, and more particularly, the recording layer at the start and end portions of recording is conspicuously destructed. When the "Guard 1 field" is formed, start portion degradation takes place only in this "Guard 1 field", so destruction of the recording layer at the remaining portions due to repeated recording is minimized.

The start portion degradation falls within a predetermined number of bytes from the recording start position in repeatedly recording information. Therefore, when the dummy data field, i.e., the "Guard 1 field" is formed inserted before a portion where actually necessary information is to be recorded (i.e., a field next to the "VFO field"), information recording/reproduction after repeated recording can be stably performed.

The start position of the "Guard 1 field" is set on the basis of the length of the "Gap field", i.e., the above-described value J. This start position corresponds to the position at which information recording is actually started with the laser beam.

The length of the "Guard 1 field" is (20+K) bytes. Of this length, 20 bytes are set as a length required as a guard field for absorbing start portion degradation due to repeated recording (start portion degradation takes place only in this field). The value K is selected from integers of 0 to 7 at random. More specifically, the value K is a random number and is set by a random shift parameter generator (to be described later). On the basis of the value K, eight different lengths can be set for the "Guard 1 field" in units of bytes at random.

With this shift to eight positions, i.e., when the "Guard 1 field" is set to eight different lengths in units of bytes, the recording layer can be prevented from being destructed by repeated recording of data (the subsequent VFO field) following the "Guard 1 field", like the "Gap field". In combination with the 16 different shifts in the "Gap field", 128 (i.e., 16×8=128) different recording start positions (start position of the next VFO field) can be set. This further increases the effect of preventing destruction of the recording layer due to repeated recording of data next to the "Guard 1 field", so the effect of preventing degradation in signal quality can be further improved.

In this "Guard 1 field", e.g., "1000100010001000" is continuously repeatedly recorded (20+K) times as a predetermined pattern of 16 channel bits. Note that this data pattern is a pattern before NRZI conversion. This also applies to the following description, i.e., all patterns to be described in this specification are patterns before NRZI conversion.

Figure 2A:
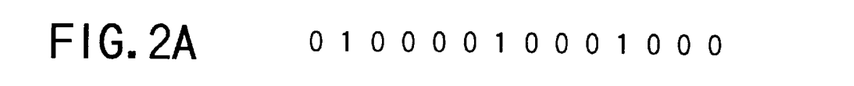
FIGS. 2A to 2D are views for explaining NRZI conversion.
Figure 2B:
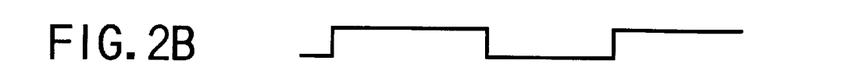
Figure 2C:
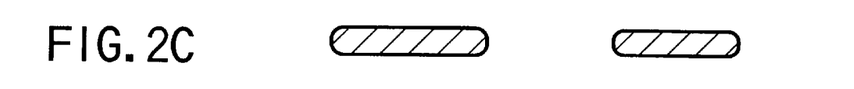
Figure 2D:
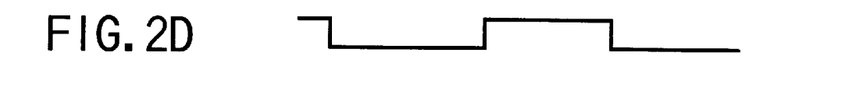

FIGS. 2A to 2D are views for explaining NRZI conversion. FIG. 2A shows data before conversion, FIG. 2B shows the waveform after conversion, FIG. 2C shows a mark and space on the optical disk corresponding to the waveform shown in FIG. 2B, and FIG. 2D shows another waveform after conversion. The waveform obtained by NRZI conversion as shown in FIG. 2B is recorded on the "Recording field" as a mark, as shown in FIG. 2C. More specifically, in case of the phase change information recording medium, portions having a crystalline phase and portions having an amorphous phase are formed in correspondence with the information to be recorded. The recorded waveform after NRZI conversion shown in FIGS. 2B or 2D is obtained by level-inverting the data at bit information "1" in the pattern before NRZI conversion as shown in FIG. 2A. Two different states can be obtained in correspondence with the information to be recorded.

The continuously repeated data pattern "1000100010001000" in the "Guard 1 field" is the same as the pattern of contents in the next "VFO field". More specifically, when the contents in the "Guard 1 field" are not destructed due to repeated recording, the "Guard 1 field" can also function as the "VFO field". The "VFO field" is a field for the PLL operation called a so-called frequency pull-in operation. Therefore, when the "Guard 1 field" functions as the "VFO field", the PLL circuit can more reliably perform the frequency pull-in operation.

The "VFO field" is a field for the PLL frequency pull-in and phase locking operations, i.e., causing the PLL circuit in the information recording apparatus (to be described later) to extract a synchronous signal in the "VFO field" and perform the pull in. In this "VFO field", a continuously repeated data pattern having a predetermined period, e.g., "1000100010001000" is repeatedly recorded 35 times. That is, the "VFO field" is set to a length of 35 bytes. As described above, the pattern "1000100010001000" in this "VFO field" is the same as that in the "Guard 1 field".

The "PS field" is a field for detecting the variation in recording position of an information signal, which is shifted at random by setting the values J and K at random, to determine the word boundary necessary for demodulation of the information signal. In the embodiment of the present invention, a pattern of only three bytes, whose DSV (Digital Sum Value) after NRZI conversion is "0", is recorded in the "PS field". For example, a pattern "000001000100100000100001001000001000001000010000" is recorded in the "PS field".

In the pattern recorded on the "PS field", the DSV after NRZI conversion is "0". In the above-described repeated pattern "1000100010001000" as the pattern to be recorded on the "Guard 1 field" and "VFO field" as well, the DSV after NRZI conversion is "0". More specifically, in a field preceding to the data field of the "Recording field", the states of two marks forming the waveform after NRZI conversion are averaged as a whole.

For the DSV calculation in modulating the information signal, the "Guard 1 field", the "VFO field", and the "PS field" need not be taken into consideration, so DSV integration can be started from the data field to be described below. With this arrangement, even when the signal quality degrades in the "Guard 1 field", the "VFO field", and the "PS field" due to repeated recording, DSV calculation for the "Data field" (to be described below) can be more properly and easily performed as compared to the prior art without being affected by these fields.

The "Data field" has a length of 2,418 bytes. This "Data field" is a field for recording data represented by address information in the "Header field". More specifically, the "Data field" is constituted by a 2,048-byte user data field as a field for recording the user's desired data, a 4-byte data ID field for recording address information, a 2-byte IED field for error detection in the data ID field, a 6-byte RSV field ensured as a reserve, a 4-byte EDC field for error detection in data, a 302-byte ECC field as a redundancy word for error correction detection, and a 52-byte SYNC field as a data synchronous signal, although none are shown.

The "PA field" is a code for setting the state necessary for demodulation of the last 1-byte data in the "Data field" and also adjusting the polarity of the waveform to be recorded on the "Guard 1 field" and the polarity of the waveform to be recorded on a "Guard 2 field" (to be described later). The "PA field" has a length of 1 byte. For the "PA field", one of four code patterns (codes 1 to 4) (to be described later) is selected on the basis of the state determined by the last 1-byte data in the "Data field" and the end polarity of the waveform based on this last 1-byte data.

The state means four states allowable when 8-bit data is modulated into data represented by a 16-bit code by 8–16 modulation. FIG. 3 is a conversion table for explaining 8–16 modulation. Certain 8-bit data (data before conversion) can be selectively modulated into one of four 16-bit codes from "State 1" to "State 4" which are defined in advance in correspondence with this data. The code in modulation is selected such that when the selected code is connected to a code which has been recorded prior to the selected code, the DSV after NRZI conversion becomes as close as a value of "0" possible.

In the 8–16 modulation, the state of a code next to the certain code is also defined in advance. In FIG. 3, "N.S." represents the state of the next data. A 16-bit code for which the state of the next code is determined as "1" or "4" can be demodulated into unique 8-bit data. On the other hand, for a 16-bit code for which the state of the next code is determined as "2" or "3", the 16-bit code cannot be demodulated into unique 8-bit data unless it is determined whether the state of the next code is "2" or "3". Therefore, to demodulate a certain 16-bit code into 8-bit data, it must be determined at least whether the state of the code next to the 16-bit code is "2" or "3".

When the state defined by the last 1-byte data (code) in the "Data field", i.e., the state of the next code defined by the last 1-byte code is "1" or "2", code 1 "0001001001000100" or code 2 "0001001000000100" is selected and used as a code to be recorded on the "PA field". When the state is "3" or "4", code 3 "1001001000000100" or code 4 "1001001001000100" is selected and used as a code to be recorded in the "PA field".

Selection of code 1 or code 2 when the state is "1" or "2", or selection of code 3 or code 4 when the state is "3" or "4", depends on the end polarity of the waveform based on the last 1-byte data in the "Data field".

The codes selected in the respective cases are made of even codes or odd codes. An even code includes the number of even "1"s. When NRZI conversion is performed, the polarity of the start portion of the code becomes equal to that of the end portion. The even codes are code 1 and code 3. An odd code includes the number of odd "1"s. When NRZI conversion is performed, the polarity is inverted at the start and end portions of the code. The odd codes are code 2 and code 4.

When such an even code or odd code is selected and used in the "PA field", the polarity of the waveform to be recorded in the "Guard 1 field" and the polarity of the waveform to be recorded in the "Guard 2 field" (to be described later) can be adjusted. More specifically, when the end polarity of the waveform based on the last 1-byte data in the "Data field" is the same as the initial polarity of the "Guard 1 field", the initial polarity of the "Guard 2 field" to be recorded next to the "PA field" can be made equal that of the "Guard 1 field" by using the even code for the "PA field". When the end polarity of the waveform based on the last 1-byte data in the "Data field" is different from the initial polarity of the "Guard 1 field", the initial polarity of the "Guard 2 field" to be recorded next to the "PA field" can be made equal that of the "Guard 1 field" by using the odd code.

As described above, by selecting the type of code to be recorded in the "PA field" from an even code or odd code, the polarity of the waveform to be recorded on the "Guard 1 field" can be made equal to that to be recorded in the "Guard 2 field" (to be described later). The polarity adjustment function in the "PA field" is effectively used in polarity randomization (to be described later).

In polarity randomization (to be described later), the polarity of the waveform after NRZI conversion, which is recorded on the "Recording field", is changed at the start of write at random. More specifically, by polarity randomization, the polarity of the waveform to be recorded at the start portion of the "Guard 1 field" is changed at the start of write at random. Even after the polarity randomization, the "Guard 2 field" having the same initial polarity as that of the "Guard 1 field" can be obtained by selecting an odd/even pattern for the "PA field". When polarity randomization allowing the recording layer to withstand repeated recording is to be performed, conditions for the "Guard 1 field" and "Guard 2 field" must match. The polarity adjustment function of the "PA field" is very important.

The "Guard 2 field" is a so-called dummy data field for absorbing end portion degradation due to repeated recording. In the "Guard 2 field", information which need not be properly reproduced is recorded (end portion degradation occurs only in this field). As described above, when information is repeatedly recorded at one position, the signal quality degrades, and more particularly, the recording layer is conspicuously destructed at the recording start and end portions. By forming the "Guard 2 field", the end portion degradation is caused to fall within the "Guard 2 field" to minimize destruction of the recording layer due to repeated recording at the remaining portions. End portion degradation falls within a predetermined number of bytes immediately before the recording end portion when information is repeatedly recorded. Therefore, when the dummy data field, i.e., the "Guard 2 field" is inserted after the field where actually necessary information is recorded, i.e., the "PA field", information recording/reproduction after repeated recording can be stably performed.

The end position of the "Guard 2 field" is set on the basis of the length of a "Buffer field" (to be described later). As will be described later, the length of the "Buffer field" is defined by the above-described value J. In other words, the end position of the "Guard 2 field" is set on the basis of the value J. This end position corresponds to the information recording end position in the "Recording field", i.e., a position where information recording by the user is ended.

The length of the "Guard 2 field" is (55−K) bytes. In the "Guard 2 field", a predetermined pattern of 16 channel bits, e.g., "1000100010001000" is repeatedly recorded (55−K) times. The value K is selected from integers of 0 to 7. The value K is set by a random shift parameter generator (to be described later). On the basis of the value K, eight different lengths can be set for the "Guard 2 field" in units of bytes at random. The value K is the same as that used to set the length of the "Guard 1 field". Therefore, the sum length of the "Guard 1 field" and "Guard 2 field" is always 75 bytes.

The "Buffer field" is a gap for preventing the "Recording field" from overlapping the subsequent preformat field, so no information is recorded on the "Buffer field". The length of the "Buffer field" is (25−J/16) bytes. The value J is selected from integers of 0 to 15 at random. The value J is set by a random shift parameter generator (to be described later). On the basis of the value J, 16 different lengths can be set for the "Buffer field" at random. The value J is the same as that used to set the length of the "Gap field". Therefore, the sum length of the "Gap field" and "Buffer field" is always 35 bytes.

As described above, in the "Recording field" of 2,567 bytes, the length excluding the "Gap field" and "Buffer field" where no actual data is recorded is always 2,532 bytes. The "Recording field" excluding the "Gap field" and "Buffer field", i.e., the field from the "Guard 1 field" to the "Guard 2 field" corresponds to a field where some data is to be actually recorded by a laser beam. This field will be referred to as an actual recording field hereinafter.

The start position of the actual recording field, i.e., the recording start position of the "Guard 1 field" can be selected from 16 positions on the basis of the value J which defines the length of the "Gap field". The start position is changed on the basis of the value J within the range of 15 channel bits. As the number of available start positions of the actual recording field increases, and as the change width of the start position increases, degradation in signal quality or destruction of the recording layer is suppressed on the average. However, in this case, since the start position largely moves, the portion where start portion degradation occurs also largely moves, and consequently, the range of start portion degradation increases.

To prevent this, the start position is shifted while combining the value J which defines the length of each of the "Gap field" and "Buffer field" with the value k which defines the length of each of the "Guard 1 field" and "Guard 2 field". With this arrangement, whole field degradation due to repeated recording can be minimized, and at the same time, the position of the start/end portion degradation can be separated as far as possible from the "Data field". More specifically, the entire actual recording field is moved at random in units of 15 bits on the basis of the value J, thereby minimizing whole field degradation due to repeated recording. Simultaneously, the portion from the "Guard 1 field" to the "Guard 2 field" in the actual recording field moved on the basis of the value j is moved at random in units of 7 bytes on the basis of the value K. With this process, the position of start/end portion degradation can be separated as far as possible from the "Data field".

Figure 4A:
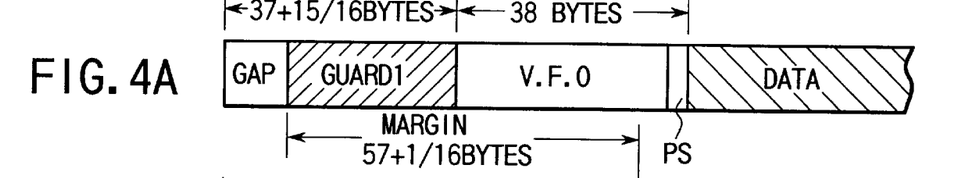
FIGS. 4A and 4B are views showing data formats in the present invention.
Figure 4B:
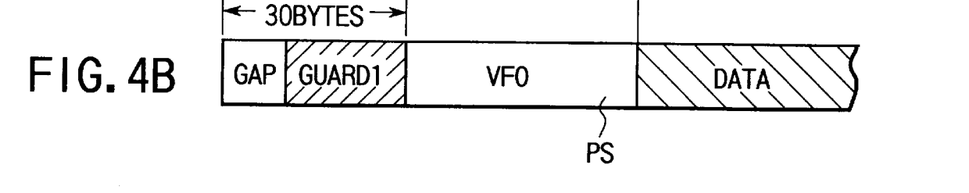

FIG. 4A shows a data format when J=15 and K=7, and FIG. 4B shows a data format when J=0 and K=0. Since the value J changes from 0 to 15 (bits) and takes 16 values, and the value K changes from 0 to 7 (bytes) and takes 8 values, 128 kinds of start position are available for the "VFO field". That is, the data recording start position of the "VFO field" changes in units of channel bits within the range of (7+15/16) bytes.

Figure 5A:
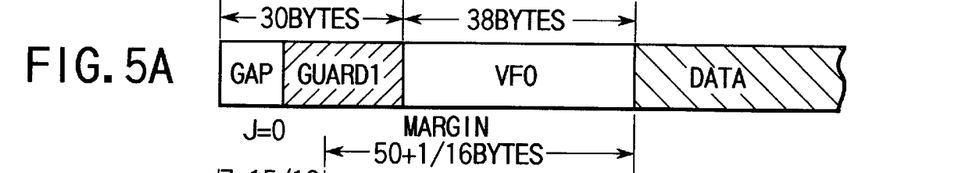
FIGS. 5A and 5B are views showing other examples of data format.
Figure 5B:
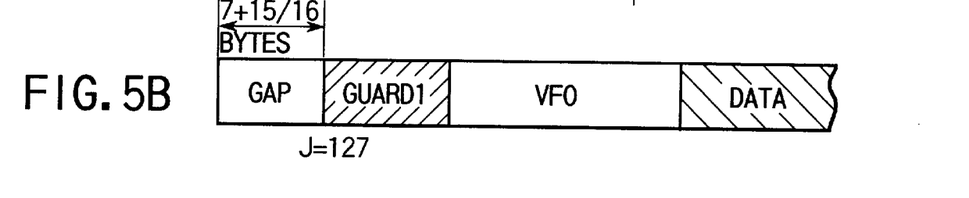

Even when the value J is set within the range of 0 to 127, and the value K is 0, the start position of the "VFO field" changes in units of channel bits within the range of (7+15/16) bytes. Even in this case, degradation due to repeated recording can be minimized. FIGS. 5A and 5B show such formats. FIG. 5A shows a case wherein J=0, and FIG. 5B shows a case wherein J=127. In this case, however, since the "Data field" also moves according to the movement of the position of start/end portion degradation, the position of start/end portion degradation cannot be separated as far as possible from the "Data field". In FIGS. 5A and 5B, this so-called margin is 50+1/16 bytes.

As in this embodiment, with the shift while combining the value J with the value K, whole field degradation due to repeated recording can be minimized, and simultaneously, the position of start/end portion degradation can be separated as far as possible from the "Data field". In the format shown in FIGS. 4A or 4B, this margin is larger than that in FIGS. 5A and 5B and is set at 57+1/16 bytes.

According to the present invention, by moving the information recording start position on the basis of the values J and K, degradation in signal quality due to repeated recording can be more effectively prevented. However, when the recording start position is moved, the word boundary of the "Data field" cannot be determined only by timing detection by the "Header field". To determine the word boundary of the "Data field", a SYNC field (not shown) as a 2-byte synchronous code is arranged at the start of each sync frame consisting of, e.g., 91-byte data in the "Data field".

If the start of the "Data field" cannot be synchronized, 91-byte data of one sync frame becomes an error. For this reason, synchronization at the start of the "Data field" is more important than that midway in the "Data field". However, in the embodiment of the present invention, since the "PS field" is inserted before the "Data field", synchronization detection probability increases, so the word boundary of the "Data field" can be reliably determined from the start of the "Data field".

In the embodiment of the present invention, the "VFO field" as a PLL pull-in field is formed before the "PS field". The phase of a reproduction PLL is locked at this portion, and then, word boundary detection of a block code (8–16 code) by the synchronous code in the "PS field" and modulation of data in the "Data field" are performed. As described above, a predetermined pattern such as "10001000 . . ." is recorded on the "VFO field". In addition, according to the embodiment of the present invention, the same pattern as that recorded in the "VFO field" is recorded on the "Guard 1 field" inserted before the "VFO field". The frequency pull-in operation is also enabled in the "Guard 1 field" as a dummy data field by the pattern repeated at a predetermined period.

The period of a predetermined pattern recorded in the "Guard 1 field" and the "VFO field" is an important factor associated with the gain of PLL. If the period of this pattern is short, the gain of the entire loop control system by the PLL is large. On the other hand, if the period of the pattern is long, the gain of the entire system becomes small. More specifically, when a predetermined pattern is repeated at a short period, the number of times of phase comparison per unit time increases, so the gain of the entire system becomes large.

As for start portion degradation, when a pattern whose mark length and space length gradually change from "coarse" to "fine" is recorded in the "Guard 1 field" and the "VFO field", the range of start portion degradation can be made small, as compared to the pattern having a predetermined period. This is due to substance movement and has been experimentally confirmed. However, with the pattern whose mark length and space length gradually change from "coarse" to "fine", the PLL operation, i.e., a so-called frequency pull-in operation cannot be performed, and the gain of the entire system by the PLL cannot be increased, either.

To the contrary, in the embodiment of the present invention, the same predetermined pattern as that in the "VFO field" is recorded in the "Guard 1 field" as a dummy data field. For this reason, start portion degradation can be properly absorbed in the "Guard 1 field", and the frequency pull-in operation is more reliably performed using not only the "VFO field" but also the "Guard 1 field".

Polarity randomization will be described next. Mark length recording in which information is recorded by changing the mark length (or space length) is performed on the basis of the waveform after NRZI conversion. In the waveform after NRZI conversion, the leading and trailing edges have information. Therefore, even when the polarity of the recording waveform after NRZI conversion is changed, information having the same contents can be recorded as shown in FIGS. 2B and 2D. In the embodiment of the present invention, the mark length is recorded on the optical disk by changing the polarity of the waveform after NRZI conversion at random. This processing of changing the polarity of the recording waveform after NRZI conversion at random will be called polarity randomization.

Polarity randomization is performed in the following manner. First, a value P is set as an initial signal polarity. This value P is a random number and is set at "0" or "1" at random by a random shift parameter generator (to be described later). The initial value of polarity of the signal waveform to be recorded is set on the basis of the value P which is set at random. The polarity is inverted depending on whether the value P is "0" or "1", thereby recording the mark length. With this arrangement, a conventional mark portion can be recorded as a space portion or vice versa, so degradation in signal quality due to repeated recording can be minimized.

An information recording apparatus for recording information on the optical disk using the above-described sector format will be described below.

Figure 6:
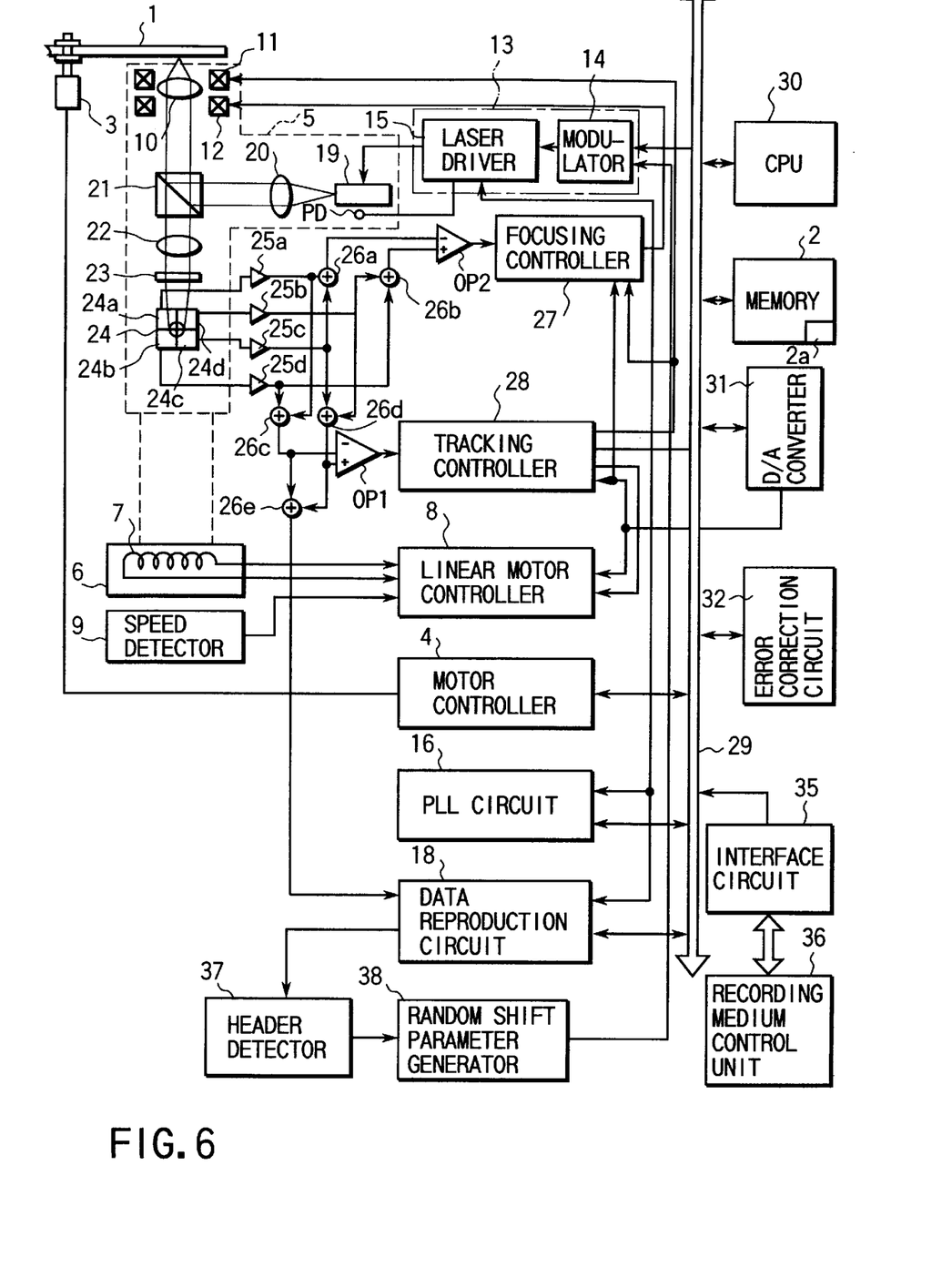
FIG. 6 is a block diagram showing an information recording apparatus for recording information on the information recording medium according to the embodiment of the present invention.

FIG. 6 is a block diagram showing the entire arrangement of the information recording apparatus.

Referring to FIG. 6, a phase change optical disk 1 is rotated by a motor 3 at, e.g., a predetermined linear speed. The motor 3 is controlled by a motor controller 4. Information is recorded/reproduced on/from the optical disk 1 by an optical pickup 5. The optical pickup 5 is fixed to a driving coil 7 constituting the movable portion of a linear motor 6. The driving coil 7 is controlled by a linear motor controller 8.

The linear motor controller 8 is connected to a speed detector 9, so the speed signal of the optical pickup 5 detected by the speed detector 9 is sent to the linear motor controller 8. A permanent magnet (not shown) is arranged at the stationary portion of the linear motor 6. When the driving coil 7 is excited by the linear motor controller 8, the optical pickup 5 is moved in the radial direction of the optical disk 1.

An objective lens 10 supported by a wire or leaf spring (not shown) is arranged in the optical pickup 5. The objective lens 10 can be moved along the focusing direction (direction of optical axis of the lens) by a driving coil 11 and can also be moved along the tracking direction (direction perpendicular to the optical axis of the lens) by a driving coil 12.

A light beam is emitted from a semiconductor laser oscillator 19 under the control of a laser controller 13. The laser controller 13 comprises a modulator 14 and a laser driving circuit 15 and operates in synchronism with a recording clock signal supplied from a PLL circuit 16. The modulator 14 modulates recording data supplied from an error correction circuit 32 into a signal suitable for recording, e.g., 8–16 modulated data. The laser driving circuit 15 drives the semiconductor laser oscillator (or an argon-neon laser oscillator) 19 in accordance with the 8–16 modulated data from the modulator 14.

In recording, the PLL circuit 16 divides the fundamental clock signal generated from a quartz oscillator into a frequency corresponding to the recording position on the optical disk 1, thereby generating a recording clock signal. In reproduction, the PLL circuit 16 generates a reproduction clock signal corresponding to a reproduced synchronous code and detects the frequency error of the reproduction clock signal. This frequency error detection is performed on the basis of whether the frequency of the reproduction clock signal is within a predetermined frequency range corresponding to the recording position of the data to be reproduced from the optical disk 1. The PLL circuit 16 also selectively outputs the recording or reproduction clock signal in accordance with a control signal from a CPU 30 and a signal from a laser source 41 in a data reproduction circuit 18.

The laser beam emitted from the semiconductor laser oscillator 19 is irradiated on the optical disk 1 through a collimator lens 20, a half prism 21, and the objective lens 10. The reflected light from the optical disk 1 is guided to a photodetector 24 through the objective lens 10, the half prism 21, a condenser lens 22, and a cylindrical lens 23.

The photodetector 24 is divided into four photodetecting cells 24a to 24d. The output signal from the photodetecting cell 24a is supplied to one terminal of an adder 26a through an amplifier 25a. The output signal from the photodetecting cell 24b is supplied to one terminal of an adder 26b through an amplifier 25b. The output signal from-the photodetector 24c is supplied to the other terminal of the adder 26a through an amplifier 25c. The output signal from the photodetecting cell 24d is supplied to the other terminal of the adder 26b through an amplifier 25d.

The output signal from the photodetecting cell 24a is also supplied to one terminal of an adder 26c through the amplifier 25a. The output signal from the photodetecting cell 24b is also supplied to one terminal of an adder 26d through the amplifier 25b. The output signal from the photodetecting cell 24c is also supplied to the other terminal of the adder 26d through the amplifier 25c. The output signal from the photodetecting cell 24d is also supplied to the other terminal of the adder 26c through the amplifier 25d.

The output signal from the adder 26a is supplied to the inverting input terminal of a differential amplifier OP2. The output signal from the adder 26b is supplied to the noninverting input terminal of the differential amplifier OP2. The differential amplifier OP2 outputs a signal associated with a focal point corresponding to the difference between the output signals from the adders 26a and 26b. This output signal is supplied to a focusing controller 27. The output signal from the focusing controller 27 is supplied to the focusing driving coil 12, so that control is performed to always bring the laser beam to an in-focus position on the optical disk 1.

The output signal from the adder 26c is supplied to the inverting input terminal of a differential amplifier OP1. The output signal from the adder 26d is supplied to the noninverting input terminal of the differential amplifier OP1. The differential amplifier OP1 outputs a track difference signal corresponding to the difference between the output signals from the adders 26c and 26d. This output signal is supplied to a tracking controller 28. The tracking controller 28 generates a track driving signal in accordance with the track difference signal from the differential amplifier OP1.

The track driving signal output from the tracking controller 28 is supplied to the driving coil 11 in the tracking direction. The track difference signal used by the tracking controller 28 is supplied to the linear motor controller 8.

Once focusing control and tracking control are performed in the above manner, a change in reflectance of the beam reflected by a pit formed on a track of the optical disk 1 is reflected to the sum signal of output signals from the photodetecting cells 24a to 24d of the photodetector 24, i.e., the output signal from an adder 26e as the sum of the output signals from the adders 26c and 26d. This signal is supplied to the data reproduction circuit 18. The data reproduction circuit 18 reproduces recorded data on the basis of the reproduction clock signal from the PLL circuit 16.

The data reproduction circuit 18 also detects a sector mark in the preformat data on the basis of the output signal from the adder 26e and the reproduction clock signal from the PLL circuit 16, and simultaneously, reproduces, from a binary signal supplied from the PLL circuit 16, a track number and sector number as address information on the basis of the binary signal and reproduction clock signal.

The reproduced data from the data reproduction circuit 18 is supplied to a header detector 37. The header detector 37 detects the header of a sector formed on the phase change optical disk on the basis of the reproduced data. Upon detecting the header formed at the start of the sector, the header detector 37 supplies a sector signal as a detection result to a random shift parameter generator 38.

The random shift parameter generator 38 generates, at random, the value J for defining the lengths of the "Gap field" and "Buffer field", the value K for defining the lengths of the "Guard 1 field" and "Guard 2 field", and the value P for defining the initial signal polarities in the "Guard 1 field" and "Guard 2 field". The generated values J, K, and P are supplied to the modulator 14, so recording data is modulated to record information on the basis of a sector format based on these parameters. The random shift parameter generator 38 will be described later in detail.

The reproduced data from the data reproduction circuit 18 is supplied to the error correction circuit 32 through a bus 29. The error correction circuit 32 corrects an error using an error correction code (ECC) in the reproduced data or adds the error correction code (ECC) to recording data supplied from an interface circuit 35 and outputs the data to a memory 2.

The reproduced data error-corrected by the error correction circuit 32 is supplied to a recording medium control unit 36 as an external unit through the bus 29 and the interface circuit 35. Recording data output from the recording medium control unit 36 is supplied to the error correction circuit 32 through the interface circuit 35 and the bus 29.

When the objective lens 10 is being moved by the tracking controller 28, the linear motor 6, i.e., the optical pickup 5 is moved by the linear motor controller 8 such that the objective lens 10 is positioned near the center of the optical pickup 5.

A D/A converter 31 is used to information exchange between the focusing controller 27, tracking controller 28, linear motor controller 8, and the CPU 30 for controlling the entire optical disk device.

The motor controller 4, the linear motor controller 8, the laser driving circuit 15, the PLL circuit 16, the data reproduction circuit 18, the focusing controller 27, the tracking controller 28, the error correction circuit 32, and the like are controlled by the CPU 30 through the bus 29. The CPU 30 performs a predetermined operation on the basis of a program recorded in the memory 2.

The information recording apparatus having the above arrangement records information on the optical disk in the following manner.

The optical pickup 5 is moved by the linear motor 6 controlled by the linear motor controller 8 such that the light beam emitted from the semiconductor laser oscillator 19 is irradiated on a predetermined position of the optical disk 1. In addition, the optical disk 1 is rotated by the motor 3 controlled by the motor controller 4 such that the light beam is irradiated on the predetermined position at a predetermined linear speed.

The light reflected by the optical disk 1 upon light beam irradiation is guided to the photodetector 24, and the output signal from the photodetector 24 is supplied to the focusing controller 27 and the tracking controller 28. The focusing controller 27 drives the driving coil 12 in the focusing direction to perform focusing control of the objective lens 10. The tracking controller 28 drives the driving coil 11 in the tracking direction to perform tracking control of the objective lens 10.

The recording data from the recording medium control unit 36 is supplied to the error correction circuit 32 through the interface circuit 35 and the bus 29. The error correction circuit 32 adds an error correction code (ECC) to the recording data supplied from the interface circuit 35 and outputs the recording data to the memory 2. The recording data output to the memory 2 is supplied to the modulator 14 and modulated into a signal suitable for recording, e.g., 8–16 modulated data.

At this time, the modulated data is formatted in accordance with the sector format shown in FIG. 1 on the basis of the values J, K, and P supplied from the random shift parameter generator 38. The laser driving circuit 15 drives the semiconductor laser oscillator 19 in accordance with the modulated data, so the light beam is irradiated on the optical disk 1.

With this operation, information is recorded on the optical disk 1 according to the sector format shown in FIG. 1 on the basis of the values J, K, and P supplied from the random shift parameter generator 38.

More specifically, the lengths of the "Gap field" and "Buffer field" are defined by the value J, the lengths of the "Guard 1 field" and "Guard 2 field" are defined by the value K, and the initial signal polarities of the "Guard 1 field" and "Guard 2 field" are defined by the value P, so that information is recorded on the basis of the sector format.

When information is recorded on the basis of the sector format according to the embodiment of the present invention, the actual recording field is shifted while combining the value J for defining the lengths of the "Gap field" and "Buffer field" with the value K for defining the lengths of the "Guard 1 field" and "Guard 2 field". With this arrangement, whole field degradation due to repeated recording is minimized, and the position of the start/end portion degradation can also be set at a position separated as far as possible from the "Data field". Simultaneously, polarity randomization is performed on the basis of the initial signal polarity set as the value P. By recording the mark length by inverting the polarity in accordance with the value P, the conventional mark portion can be recorded as a space portion or vice versa, so degradation in signal quality due to repeated recording can be minimized.

In the embodiment of the present invention, since the "PS field" is inserted before the "Data field", the synchronization detection probability is improved, so the word boundary of the "Data field" can be properly determined from the start of the "Data field". In addition, since the same data pattern as that recorded in the "VFO field", which has a predetermined period, is recorded in the "Guard 1 field" inserted before the "VFO field", the frequency pull-in operation can be performed even in the "Guard 1 field" as a dummy data field.

Figure 7:
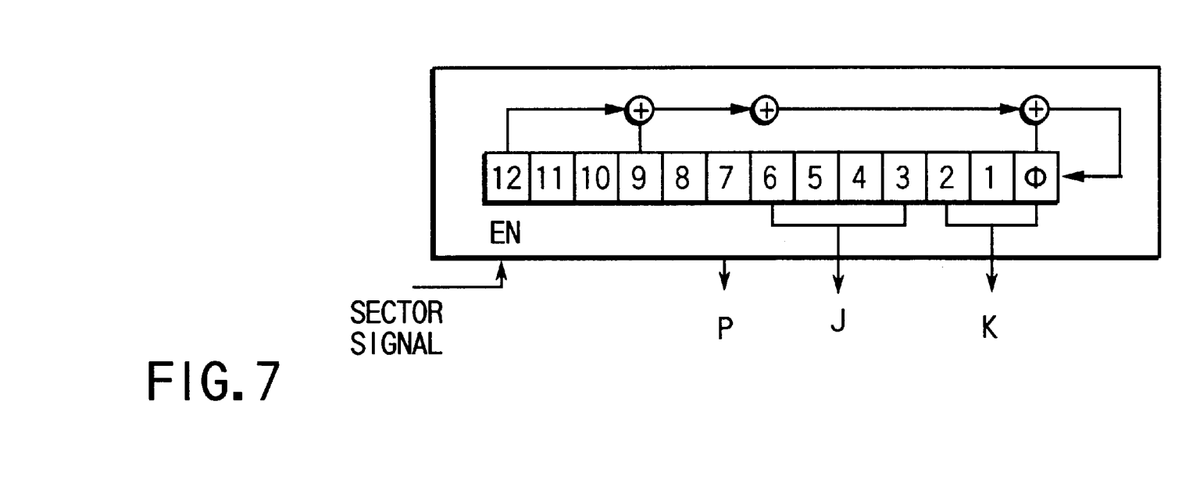
FIG. 7 is a block diagram showing a random shift parameter generator as part of the information recording apparatus according to the embodiment of the present invention.

FIG. 7 shows the arrangement of the random shift parameter generator for generating the values J, K, and P for setting the sector format according to the embodiment of the present invention shown in FIG. 1.

The random shift parameter generator shown in FIG. 7 is constituted by a 13-bit feedback shift register, i.e., so-called an M period sequence counter. The period of the M period sequence counter is 8,191 (i.e., $2^{13}-1$). The content (output value) of this counter becomes identical for every 8,192nd input clock, although it changes at random for 8,191 clocks which are continuously input.

In FIG. 7, 13 squares arranged in the horizontal direction indicates bits of the shift register. Of the 13 bits, the right end bit is an LSB (Least Significant Bit), and the left end bit is an MSB (Most Significant Bit), so the bits are shifted from the right end to the left end. The bits will be sequentially referred to as bit 12, bit 11, . . . , bit 0 from the MSB. In shifting the bits, the content of bit 11 is loaded in bit 12, the content of bit 10 is loaded in bit 11, . . . , and the content of bit 0 is loaded in bit 1. The calculation result of (bit 12) xor (bit 9) xor (bit 6) xor (bit 0) is loaded in bit 0 where xor represents an exclusive or. In this shift register, even time a data write of one sector is performed, i.e., every time the sector signal is supplied from the header detector 37 shown in FIG. 6, bits are shifted once.

The random shift parameter generator constituted by the shift register having the above arrangement according to the embodiment of the present invention generates, as random shift parameters, the value K from the three bits from bit 2 to bit 0 of the total of 13 bits as the shift register contents, the value J from three bits from bit 6 to bit 3, and the value P from bit 7. By generating the random shift parameters by the M period sequence counter, even when information is repeatedly recorded in one sector, degradation due to repeated recording can be minimized because the values J, K, and P are generated at random. In addition, since the period of the M period sequence counter is sufficiently large, no polarization in shift amount between the fields is generated even when information is repeatedly recorded on a plurality of continuous sectors, so degradation in characteristics due to repeated recording can be suppressed.

As has been described above, the information recording medium and apparatus according to the present invention allows to prevent degradation in quality of the reproduced signal due to whole field degradation and start/end portion degradation even when information is repeatedly recorded and allows to reliably reproduce recorded information.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium on/from which information is recorded/reproduced in units of sectors each having at least a header field on which address information is recorded in advance and a recording field arranged next to said header field, using a change in optical characteristics due to a phase change, said recording field comprising:

an actual recording field on which information is rewritably recorded;

a first nonrecording field arranged before said actual recording field and having a length based on a first random number to prevent interference between said header field and said actual recording field, wherein a recording start position of said actual recording field is set at random; and a second nonrecording field arranged next to said actual recording field and having a length based on the first random number, and a sum of the lengths of said first and second nonrecording fields is always constant, wherein said actual recording field includes a first dummy data field arranged at a start of said actual recording field and having a predetermined length, said first dummy data field recording dummy information which need not be properly reproduced.

2. A medium according to claim 1, wherein the predetermined length of said first dummy data field is based on a second random number.

3. A medium according to claim 2, wherein said actual recording field includes a second dummy data field arranged at an end portion of said actual recording field and having a length based on the second random number, said second dummy data field recording dummy information which need not be properly reproduced, and a sum of the lengths of said first and second dummy data fields is always constant.

4. A medium according to claim 1, wherein said actual recording field comprises a repeated field arranged next to said first dummy data field, which records a continuously repeated data pattern to generate a clock signal, and the same repeated pattern as that in said repeated field is recorded on said first dummy data field.

5. A medium according to claim 2, wherein the first random number is generated in units of channel bits, and the second random number is generated in units of bytes each corresponding to 16 channel bits.

6. A medium according to claim 4, wherein said recording field includes a data field arranged next to said repeated field to record user data, and said recording field records a pattern using a waveform which is set at low level or high level in correspondence with the information to be recorded, and a level average value of waveforms used in fields before said data field in said recording field is an intermediate value between the low and high levels.

7. A medium according to claim 3, wherein said recording field records a pattern using a waveform which is set at low level or high level in correspondence with the information to be recorded, and said recording field includes a data field arranged next to said first dummy data field to record user data, and post amble field for selectively recording one of an even code whose waveform state at a start portion is the same as that at an end portion and an odd code whose waveform state at a start portion is different from that at the end portion, based on the waveform state at an end portion of said data field, thereby making the waveform state at a start portion of said first dummy data field equal to state at a start portion of said second dummy data field.

8. A method of recording information in a recording field of an information recording medium in/from which information is recorded/reproduced in units of sectors each having at least a header field in which address information is recorded in advance and said recording field arranged next to said header field and including an actual recording field in which information is rewritably recorded, using a change in optical characteristics due to a phase change, comprising:

generating a first random number;

forming, before said actual recording field, a first nonrecording field having a length based on the first random number to prevent interference between said header field and said actual recording field, wherein a recording start position of said actual recording field is set at random;

forming next to said actual recording field, a second nonrecording field having a length based on the first random number, wherein a sum of the lengths of said first and second nonrecording fields is always constant; and recording first dummy information having a predetermined length, which need not be properly reproduced, at a start of said actual recording field.

9. A method according to claim 8, wherein the recording of the first dummy information includes:

generating a second random number; and setting the predetermined length of said dummy data field based on the second random number.

10. A method according to claim 9, further comprising recording second dummy information having a length based on the second random number, which need not be properly reproduced, at an end portion of said actual recording field, wherein a sum of the lengths of said first and second dummy data fields is always constant.

11. A method according to claim 8, wherein the first random number is generated using an M period sequence counter.

12. A method according to claim 9, wherein the first and second random numbers are generated using an M period sequence counter.

* * * * *